United States Patent
Pedersen et al.

(10) Patent No.: US 12,216,601 B2
(45) Date of Patent: Feb. 4, 2025

(54) BUS DECODER

(71) Applicant: NORDIC SEMICONDUCTOR ASA, Trondheim (NO)

(72) Inventors: Frode Milch Pedersen, Trondheim (NO); Markku Vähätaini, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 146 days.

(21) Appl. No.: 17/747,511

(22) Filed: May 18, 2022

(65) Prior Publication Data

US 2022/0374377 A1    Nov. 24, 2022

(30) Foreign Application Priority Data

May 20, 2021 (FI) .................................... 20215598

(51) Int. Cl.
*G06F 13/362* (2006.01)
*G06F 11/34* (2006.01)

(52) U.S. Cl.
CPC .......... *G06F 13/362* (2013.01); *G06F 11/349* (2013.01)

(58) Field of Classification Search
CPC ... G06F 13/362; G06F 11/349; G06F 12/1483
USPC ......................................... 710/110, 306–316
See application file for complete search history.

(56) References Cited

U.S. PATENT DOCUMENTS

| | | | | |
|---|---|---|---|---|
| 5,936,867 A * | 8/1999 | Ashuri | ................ | G06F 30/3312 716/108 |
| 5,987,620 A * | 11/1999 | Tran | ...................... | G06F 9/3836 712/E9.063 |
| 6,195,734 B1 * | 2/2001 | Porterfield | ............... | G09G 5/39 711/219 |
| 6,247,137 B1 * | 6/2001 | Wickeraad | ................ | G06F 1/12 713/401 |
| 6,356,132 B1 * | 3/2002 | Mastrocola | ............ | H03K 5/131 327/299 |
| 6,813,722 B1 * | 11/2004 | Yeh | .......................... | G06F 1/04 713/401 |
| 7,676,542 B2 * | 3/2010 | Moser | .................. | G06Q 10/107 709/204 |
| 8,099,624 B1 * | 1/2012 | Saxena | ............... | G06F 11/0727 714/5.11 |

(Continued)

FOREIGN PATENT DOCUMENTS

| | | |
|---|---|---|
| EP | 1 571 559 | 9/2005 |
| WO | 2020/002534 | 1/2020 |

OTHER PUBLICATIONS

Search Report for FI20215598, dated Dec. 17, 2021, 2 pages.

(Continued)

*Primary Examiner* — Paul R. Myers
(74) *Attorney, Agent, or Firm* — Nixon & Vanderhye PC

(57) ABSTRACT

According to an aspect, there is provided a solution for providing an access to a slave unit. An address from a master unit trying to access a slave unit is received (400). The received address is mapped (402) to a slave address. Default access permissions are associated (404) to the master-slave connection. Additional access permissions associated with the master unit and the slave address are determined (406). The master-slave connection is enabled (408) if additional access permissions allow the master unit to access the slave, otherwise the connection is rejected.

16 Claims, 3 Drawing Sheets

(56) References Cited

U.S. PATENT DOCUMENTS

| | | | | |
|---|---|---|---|---|
| 8,640,194 | B2* | 1/2014 | Inoue | G06F 21/52 726/17 |
| 2002/0198609 | A1* | 12/2002 | Baron | G05B 19/042 700/48 |
| 2003/0005345 | A1* | 1/2003 | Fletcher | G06F 1/06 713/401 |
| 2003/0172214 | A1* | 9/2003 | Moyer | G06F 21/85 710/200 |
| 2004/0237003 | A1* | 11/2004 | Adkisson | G06F 11/348 714/47.2 |
| 2004/0243823 | A1 | 12/2004 | Moyer et al. | |
| 2005/0039001 | A1* | 2/2005 | Hudis | G06F 21/6218 713/166 |
| 2005/0091179 | A1* | 4/2005 | Kalthoff | G06F 21/62 |
| 2005/0235084 | A1* | 10/2005 | Nariai | G06F 13/4022 710/316 |
| 2006/0063590 | A1* | 3/2006 | Abassi | A63F 13/71 463/29 |
| 2006/0155903 | A1* | 7/2006 | Soga | G06F 13/362 710/240 |
| 2006/0155904 | A1* | 7/2006 | Murakami | G06F 13/1663 710/240 |
| 2006/0195449 | A1* | 8/2006 | Hunter | G06F 21/6227 707/999.009 |
| 2007/0073695 | A1* | 3/2007 | Conlan | G06F 16/9535 707/999.009 |
| 2007/0156691 | A1* | 7/2007 | Sturms | G06F 21/6218 707/999.009 |
| 2007/0300287 | A1* | 12/2007 | Wynne | G06F 21/575 726/2 |
| 2008/0172498 | A1* | 7/2008 | Boucard | G06F 13/4027 710/1 |
| 2009/0037779 | A1* | 2/2009 | Kawakami | G06F 13/385 714/48 |
| 2009/0182974 | A1* | 7/2009 | Greiner | G06F 12/1475 711/208 |
| 2010/0005213 | A1 | 1/2010 | Butter et al. | |
| 2010/0153862 | A1* | 6/2010 | Schreiber | G06Q 30/0273 726/8 |
| 2012/0101952 | A1* | 4/2012 | Raleigh | H04L 12/1417 709/223 |
| 2012/0198192 | A1* | 8/2012 | Balasubramanian | G06F 12/0246 711/163 |
| 2013/0111168 | A1* | 5/2013 | Circello | G06F 9/526 711/E12.098 |
| 2013/0232189 | A1* | 9/2013 | Lewis | H04L 67/535 709/219 |
| 2014/0007154 | A1* | 1/2014 | Seibold | H04N 21/454 725/25 |
| 2014/0245373 | A1* | 8/2014 | Martin | H04W 4/08 726/1 |
| 2015/0095662 | A1* | 4/2015 | Jejurikar | G06F 12/14 713/193 |
| 2015/0248730 | A1* | 9/2015 | Pilot | G06Q 10/06 705/4 |
| 2015/0261688 | A1* | 9/2015 | Craddock | G06F 12/0866 711/163 |
| 2015/0295916 | A1* | 10/2015 | Sanso | G06F 21/335 726/9 |
| 2016/0124400 | A1* | 5/2016 | Kanayama | H02M 3/1584 307/116 |
| 2016/0224021 | A1* | 8/2016 | Kuikka | B02C 21/026 |
| 2017/0090983 | A1* | 3/2017 | Kovalev | G06F 12/0842 |
| 2017/0154166 | A1* | 6/2017 | Klein | G06F 21/6245 |
| 2017/0171214 | A1* | 6/2017 | Anderson | G06F 16/27 |
| 2017/0185345 | A1* | 6/2017 | Lim | G06F 12/1441 |
| 2017/0295094 | A1* | 10/2017 | Jackson | H04L 67/01 |
| 2017/0346830 | A1* | 11/2017 | Goldfarb | H04L 63/104 |
| 2018/0157590 | A1* | 6/2018 | Persson | G06F 12/0833 |
| 2018/0225466 | A1* | 8/2018 | Ducatel | H04L 9/3247 |
| 2019/0050587 | A1* | 2/2019 | Dang | G06F 21/6209 |
| 2019/0095356 | A1* | 3/2019 | Milojicic | G06F 12/023 |
| 2019/0179645 | A1* | 6/2019 | Prasad | G06F 9/4416 |
| 2019/0306170 | A1* | 10/2019 | Wang | H04L 63/20 |
| 2019/0324806 | A1* | 10/2019 | Javre | G06F 8/30 |
| 2020/0050454 | A1* | 2/2020 | Barnes | G06F 9/324 |
| 2020/0394141 | A1* | 12/2020 | Ramagiri | G06F 12/0817 |
| 2021/0400479 | A1* | 12/2021 | Li | H04L 63/0869 |
| 2023/0076376 | A1* | 3/2023 | Hoel | H04L 63/029 |

OTHER PUBLICATIONS

"PIC32 Family Reference Manual. Microchip Technology Inc.", [online], Nov. 2013, section 48, retrieved Dec. 15, 2021, https://microchip.com/downloads/en/DeviceDoc/60001214A.pdf, 28 pages.

"SPC58 line—How to use the Memory Protection Layers", STMicroelectronics, [online], May 2019, retrieved Dec. 12, 2021, http://www.st.com/respuree/technical_note/tn1289-spc58-line--how-to-use-the-memory-protection-layers-stmicroelectronics.pdf, 52 pages.

"ARM® CoreLinkTM TZC-400 TrustZone Address Space Controller", Technical Reference Manual, Feb. 20, 2014, https://developer.arm.com/documentation/ddi0504/c, 76 pages.

Extended European Search Report issued on Sep. 23, 2022 in corresponding European Application No. 22173274.6, 3 pages.

\* cited by examiner

BUS DECODER

This application claims priority to FI 20215598 filed May 20, 2021, the entire contents of which is hereby incorporated by reference.

TECHNICAL FIELD

Various example embodiments relate to bus decoders.

BACKGROUND

In computing design one of the main goals is to realise reliable and fast operation of devices. In modern computing design the circuits are complex comprising a large number of different components. A typical structure used in circuit design is bus design, where a bus is used to connect components to each other. For example, a given number of master or manager units may be connected to a given number of slave or subordinate units via one or more buses. Slave units may be memories, for example.

Security aspects in device design are taken increasingly into account. It has become more and more important that data and data units are accessed only by those units that are authorized to do so.

BRIEF DESCRIPTION

According to an aspect, there is provided a bus decoder operationally connectable to a set of master units and a set of slave units, comprising a circuitry for causing the decoder to: receive an address from a master unit trying to access a slave unit; map the received address to a slave address; associate default access permissions to the master-slave connection; determine additional access permissions associated with the master unit and the slave address; enable the master-slave connection if additional access permissions allow the master unit to access the slave, otherwise reject the connection.

According to another aspect, there is provided a method for providing an access to a slave unit, the method comprising: receiving an address from a master unit trying to access a slave unit; mapping the received address to a slave address; associating default access permissions to the master-slave connection; determining additional access permissions associated with the master unit and the slave address; enabling the master-slave connection if additional access permissions allow the master unit to access the slave, otherwise reject the connection.

One of the advantaged provided by the aspects is that proposed bus decoder does not steal time neither from master or slave bus path. It adds a very low overhead to bus decoding time as the lookups are parallel and not serial.

Embodiments are defined in the dependent claims. The scope of protection sought for various embodiments is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

Figure 1:
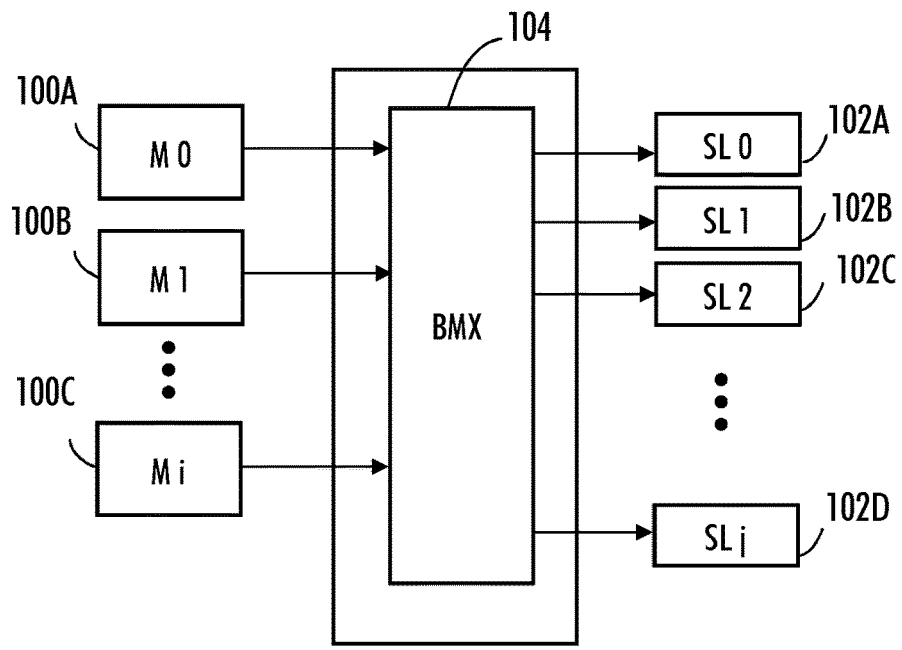
FIG. 1 illustrates an example using a bus to interconnect components in a circuit.

Integrated circuits or chips are designed for numerous purposes with different designs. System on a chip, SoC, is one kind of integrated circuit where a desired system is designed on a circuit, utilizing many kinds of components. For example, a computer or other kind of electronic system may be designed on a chip. FIG. 1 illustrates an example using a bus to interconnect components in a circuit. The figure shows three masters 100A, 100B, 100C, which are connected to a set of slave units 102A, 102B, 102C, 102D via a bus matrix 104.

The masters may be, for example, processors (Central Processing Units CPUs, Digital Signal Processors DSPs), Direct Memory Access (DMA) modules (modules designed for data transfers between memories or between peripherals or memory), peripherals with built-in DMA, or bridges connecting one bus to another bus. The bridge may be a slave on one bus and a master on the other bus.

The slaves may be, for example, memories (non-volatile memory, random access memory RAM, external memory), peripherals (configuration and data registers) or bridges, connecting one bus to another.

The above list are merely non-limiting examples of possible masters and slaves. The embodiments are not limited to above examples as they do not depend on the types of master or slaves. The embodiments can be applied to any integrated circuit comprising a bus and a bus decoder. The embodiments can be applied especially in integrated circuits, where masters may have different privileges.

Typically, the bus 104 comprises a bus decoder, which maps address received from a master 100A, 100B, 100C to a slave 102A, 102B, 102C, 102D address.

Figure 2:
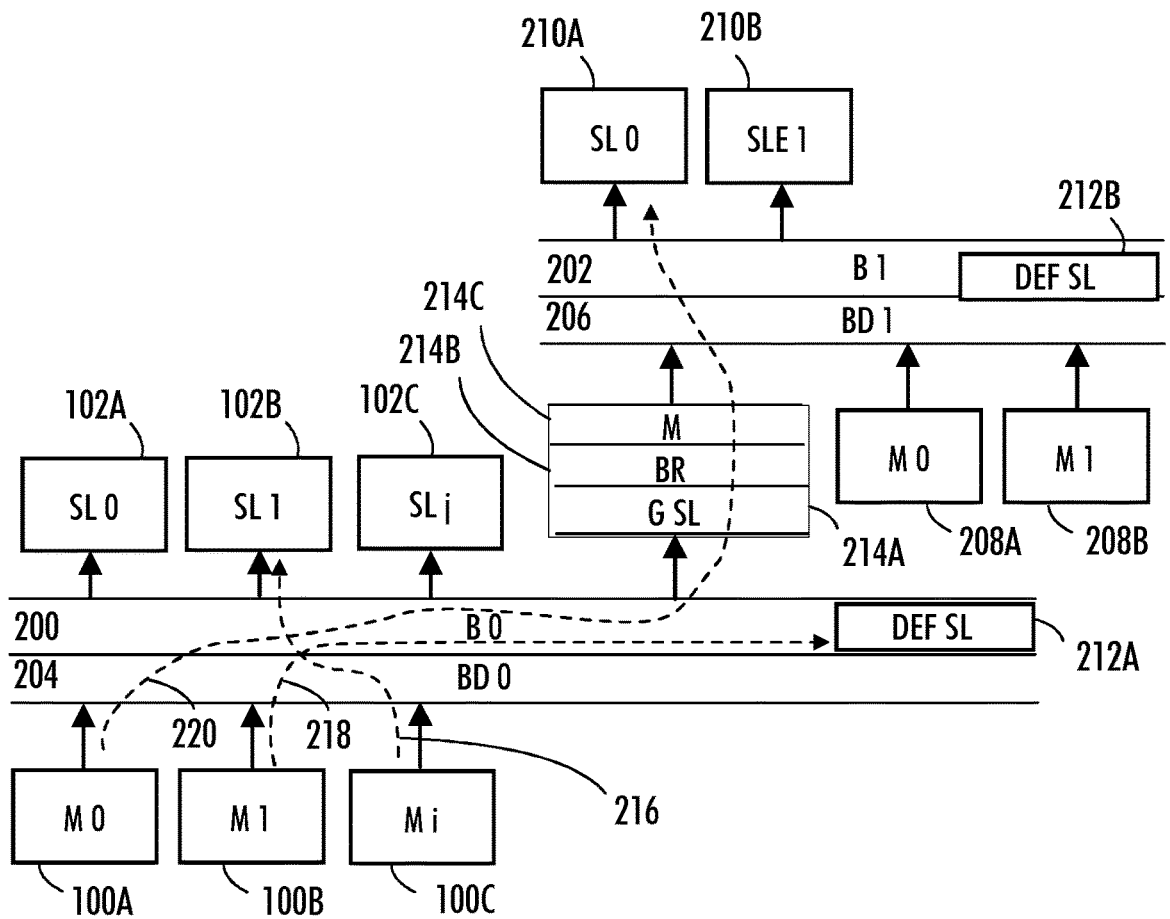
FIG. 2 illustrates an example of bus transactions.

FIG. 2 illustrates an example of bus transactions between masters and slaves in a system.

The example shows two buses, Bus 0 200 and Bus 1 202. Each bus has its own bus decoder 204, 206.

Masters 100A, 100B, 100C are connected to the first bus 200 and masters 208A, 208B are connected to the second bus 202. Slaves 102A, 102B, 102C are connected to the first bus 200 and slaves 210A, 210B to the second bus 202.

In this example, each bus also comprises a default slave 212A, 212B, which is configured to act as an error handler in case there is a transaction, which cannot be connected to any actual slave of the system.

In an embodiment, the system further comprises a global slave 214A, which is used when a transaction is not matched to any local slave of a bus. A global slave may comprise a bridge 214B to another bus of the system, in this example to the second bus 202. The device may also act as a master 214C to the bus 202.

There are three example transactions illustrated in FIG. 2. Master 100C tries to access slave 102B. The bus decoder 204 maps the address received from the master 100C to the slave 102B address and enables the connection 216.

Master 100B tries to access a slave address. The bus decoder 204 determines that the address does not match any slave on the bus, and it is connected 218 to default slave 212A, which generates a bus error.

Master 100A tries to access a slave 210A. The bus decoder 204 determines transaction is not matched to any local slave and the bus decoder connects the transaction 220 through global slave 214A, the bridge 214B and the from master 214C to the desired slave 210A.

In some cases, there is a need to perform security filtering, i.e. limit the permissions of master to access the slaves. In prior art, such solutions are based on separate modules on master side, which steal time from bus access path of the masters. Alternatively, the security filtering has been performed by an address filter on the slave side, which steals time from slave decoding cycle. In both above cases the security filtering is independent of bus decoder.

Figure 3:
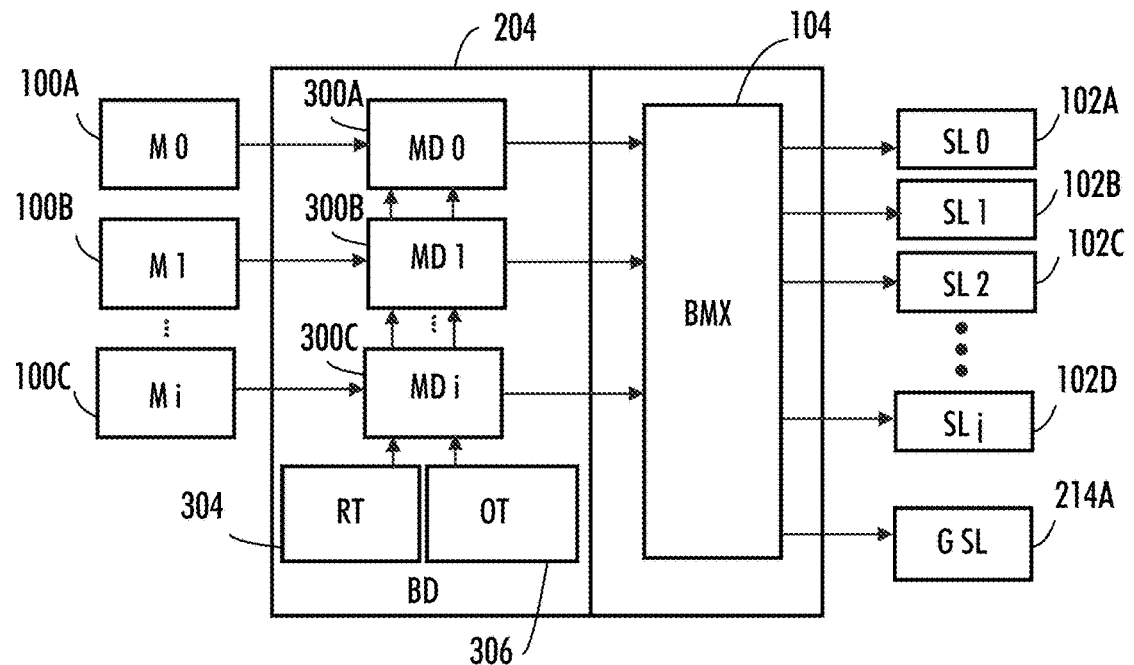
FIG. 3 illustrates an embodiment where a bus decoder is configured to perform security filtering.

FIG. 3 illustrates an embodiment where a bus decoder 204 is configured to perform security filtering.

The figure shows three masters or master units 100A, 100B, 100C, which are connected to a set of slave units 102A, 102B, 102C, 102D and a global slave 214A via a bus matrix 104. The figure further shows a bus decoder 204. The bus decoder comprises a set of master decoders 300A, 300B, 300C. In an embodiment, the number of master decoders corresponds to the number of masters connected to the bus decoder. The bus decoder further comprises tables or data bases, which may be denoted as a region table 304 and an override table 306.

Figure 4:
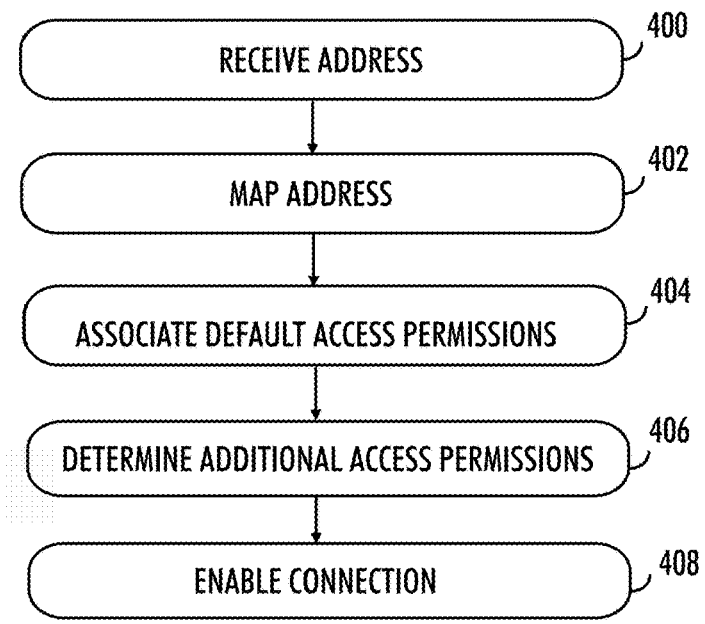
FIG. 4 is a flowchart illustrating an embodiment.

FIG. 4 is a flowchart illustrating an embodiment. The flowchart illustrates the operation of a bus decoder 204 operationally connected to one or more masters or master units and a set of slave units.

In step 400, the bus decoder is configured to receive an address from a master unit trying to access a slave unit.

In step 402, the bus decoder is configured to map the received address to a slave address.

In step 404, the bus decoder is configured to associate default access permissions to the master-slave connection. In an embodiment, each slave connected to the bus matrix is assigned a default access permission, which is applicable to all addresses within the same slave and which applies to all masters accessing the slave. Each slave may have different default access permissions. The default permissions may have been set independently for read, write, execute and secure processes.

In step 406, the bus decoder is configured to determine additional access permissions associated with the master unit and the slave address. The additional access permissions depend on the master trying to access the slave. In an embodiment, the additional access permissions can be set up per master or shared for a group of masters.

In an embodiment, one or more masters comprise a unique identity. In an embodiment, whenever a master tries to access a slave the access request may comprise the master identity. The identity may be denoted with a unique OwnerID sideband information, for example as an AxUSER signal, in systems utilising Advanced eXtensible Interface, AXI.

For example, the system may comprise a set of system masters with the same access privileges, each having a unique identification. They may be located anywhere in the system, not necessarily in local interconnect. Various interconnects may be connected to each other by a set of bridges and transactions may be routed to different parts of the system than where the system master is located. In an embodiment, when receiving an address from a system master, and the unique identification of the master, the bus decoder may be configured to determine additional access permissions based in part to the unique identification.

In step 408, the bus decoder is configured to enable the master-slave connection if additional access permissions allow the master unit to access the slave, otherwise reject the connection.

In an embodiment, the region table 304 comprises a set of slave entries, each containing the slave number, start address, and address mask of a slave region. The region table also comprises default access permissions. In an embodiment, the region table is shared among all master decoders, so that slave entries can be shared among masters. In an embodiment, each master is configured to see only a specific subset of the full region table. Thus, the connection between region entries and master decoders can be viewed as a sparsely populated matrix, defined by a static configuration for each device, which may have been defined at design time. mapping between addresses from master units and slave addresses and default permissions of slave addresses.

In an embodiment, the override table 306 defines overriding access permissions for any physical address range, which may map to a subset of a slave address range. Each master decoder may be connected to a subset of the override entries, also mapped as a sparsely populated matrix.

In an embodiment, the override table 306 comprises entries for slave address ranges, an entry comprising start and end addresses for the entry, indication which default access permissions are overridden, additional access permissions for the overridden default permissions, indications of master units the additional access permissions relate to, and indication of remapping.

In an embodiment, the bus decoder may be configured to determine the identity of the master requesting access to a slave and determine access permissions utilizing the identity and the override table.

In an embodiment, both or one of the region and override tables may comprise a mix of hardwired parametrized constants and programmable register entries.

As mentioned, in an embodiment, if the bus decoder detects that the address from a master does not match to any local slave of the bus connected to the bus decoder, the bus decoder is configured to a global slave 214A which may forward the connection to another bus.

Figure 5:
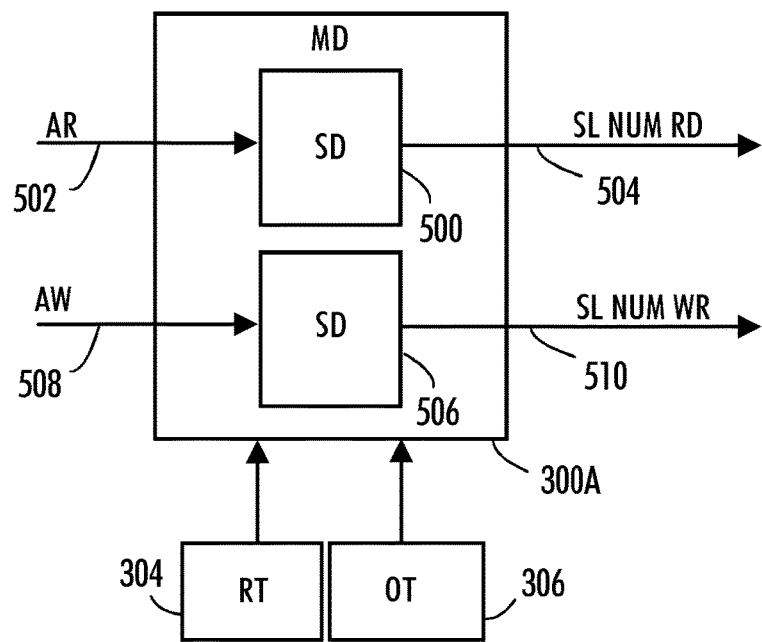
FIG. 5 illustrates an embodiment of a master decoder.

FIG. 5 illustrates an embodiment of a master decoder 300A (and 300B, 300C). The master decoder 300A comprises a first secure decoder 500 having as an input read address 502 from a master. As an output the first secure decoder 500 has the address 504 of the slave to be read. The master decoder further comprises a second secure decoder 506 having as an input write address 508 from a master. As an output the second secure decoder 506 has the address 510 of the slave of the write operation.

Thus, in an embodiment, the master decoder comprises independent decoders 500, 506 for read and write streams. Both operations may be run concurrently.

The proposed bus decoder performing security filtering does not steal time neither from the master or slave bus path. It adds a very low overhead to bus decoding time as the lookups are parallel and not serial. It provides security filtering at a very low cost, as same information may be used to define slave regions and permission regions.

As the additional access permissions may be associated with a master unit, complex security patterns are possible. Different permissions regarding the same slave region may be given to different masters. Multiple transactions owners are supported in the system.

Figure 6:
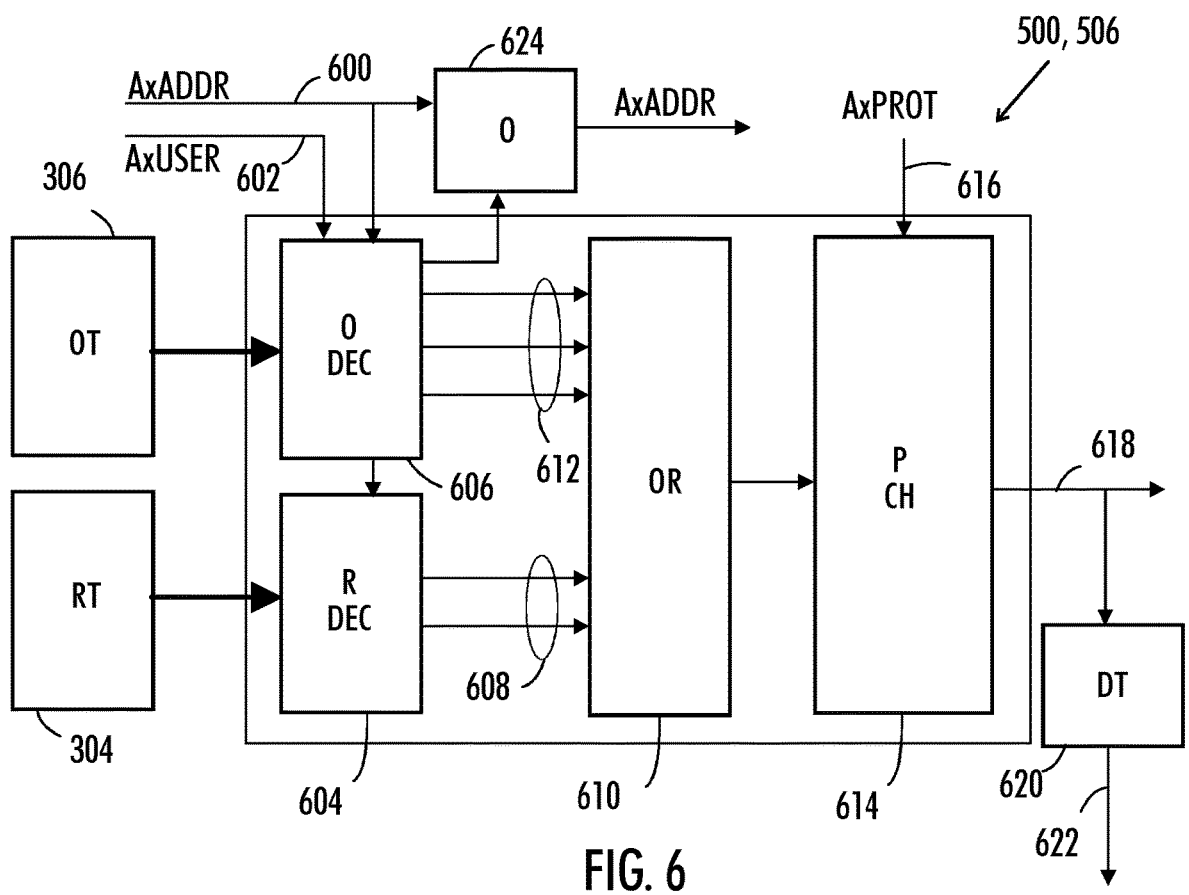
FIG. 6 illustrates an embodiment of a secure decoder.

FIG. 6 illustrates an embodiment of a secure decoder 500, 506. The input to the secure decoder comprises region and override tables 304, 306, address (read or write) AxADDR 600 from a master and identity AxUSER 602 of the master.

The address 600 from the master is provided to a region decoder 604 and the address 600 and the identity 602 of the master to the override decoder 606.

In an embodiment, the region decoder is configured to receive the address 600, map the received address to a slave address and associate default access permissions to the master-slave connection. The information 608 may be provided to an override unit 610.

In an embodiment, the override decoder 606 is configured to determine additional access permissions associated with the master unit and the slave address. The information 612 may be provided to an override unit 610.

In an embodiment, the override unit 610 enables the master-slave connection if additional access permissions allow the master unit to access the slave, otherwise reject the connection.

In an embodiment, in systems utilising Advanced eXtensible Interface, AXI, there may be a further check in permission check unit 614, based on AxPROT signal 616 which may provide additional access protection, for example privileged/unprivileged access or instruction/data access.

At the output of the bus decoder is the slave address 618.

In an embodiment, the bus decoder is configured to apply a configurable delay to slave access. The bus decoder may comprise a delay table 620, which may be used to introduce programmable delay to slave access for debugging purposes. In an embodiment, the delay information 622 may be provided to real-time choke, for stress testing of the system for slow slaves. In some system, some slaves may have varying latency. The delay table may comprise a given delay value for a slave address, simulating a maximum delay regarding the slave. The real-time choke (not shown) may delay a given transaction with a given number of cycles indicated in the delay table. Thus, a worst-case scenario for a slave latency may be simulated.

In a further embodiment, the override decoder may override the slave decoding by the region decoder and provide as a result a different slave address, thus remapping the master to a different slave or different memory address of a slave.

The proposed bus decoder supports remapping of one address range to another.

In a further embodiment, the override decoder may apply an offset 624 to a slave address. Thus, the master may be routed to a different slave or different memory address of a slave by introducing the offset. The offset may be programmable offset providing a remapping functionality. The offset may also direct the access to a different bus through the global slave.

In an embodiment, the region table and decoder may use hardwired entries, while the override table and decoder may use programmable entries. However, this may be configurable option.

In an embodiment, a master connected to the bus decoder may only access a configurable subset of addresses in region and override tables. Thus, a master may use a mix of region/override entries shared with other masters, and unique region/override entries not seen by other masters. The connection between region/override and masters can be viewed as a sparsely populated matrix configured at design time.

In an embodiment, a slave address range can be broken up into multiple region/override entries, in case different subranges of the address space has different default access permissions.

The proposed apparatus can be realized as a circuitry operationally connected or connectable to one or more master units and slave units and a bus.

As used in this application, the term 'circuitry' refers to one or more of the following: hardware-only circuit implementations such as implementations in only analogue and/or digital circuitry; combinations of hardware circuits and software and/or firmware; and circuits such as a microprocessor(s) or a portion of a microprocessor(s) that require software or firmware for operation, even if the software or firmware is not physically present. This definition of 'circuitry' applies to uses of this term in this application. As a further example, as used in this application, the term "circuitry" would also cover an implementation of merely a processor (or multiple processors) or portion of a processor, e.g. one core of a multi-core processor, and accompanying software and/or firmware. The term "circuitry" would also cover, for example and if applicable to the particular element, a base-band integrated circuit, an application-specific integrated circuit (ASIC), and/or a field-programmable grid array (FPGA) circuit for the apparatus according to an embodiment of the invention.

Embodiments described herein are applicable to various systems where memory circuits are accessed. defined above but also to other systems. The protocols used, the specifications of the systems and their elements develop rapidly. Such development may require extra changes to the described embodiments. Therefore, all words and expressions should be interpreted broadly, and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. A bus decoder, operationally connectable to a set of master units and a set of slave units, comprising circuitry configured to cause the decoder to:
   receive an address from a master unit trying to access a slave unit;
   map the received address to a slave address;
   associate default access permissions to the master-slave connection, where a specific subset of the default access permissions is accessible to each master, the default access permissions being dependent on which slave the master is trying to access;
   determine additional access permissions associated with the master unit and the slave address, where a specific subset of the additional access permissions is accessible to each master, additional access permissions being obtained from an override table and depending on which master is trying to access the slave; and
   enable the master-slave connection if additional access permissions allow the master unit to access the slave, otherwise reject the connection.

2. The bus decoder of claim 1, wherein the circuitry is configured to apply an offset to the slave address, the offset remapping the connection to another slave unit or slave region than indicated by the address received from the master unit.

3. The bus decoder of claim 1, wherein the circuitry is configured to apply a configurable delay to slave access for debugging purposes.

4. The bus decoder of claim 1, wherein the circuitry is configured to cause the decoder further to: maintain a region table comprising
 mapping between addresses from master units and slave addresses;
 default permissions of slave addresses.

5. The bus decoder of claim 1, wherein the circuitry is configured to cause the decoder further to maintain the override table, the override table comprising entries for slave address ranges, an entry comprising:
 start and end addresses for the entry;
 indication which default access permissions are overridden;
 additional access permissions for the overridden default permissions;
 indications of master units the additional access permissions relate to;
 indication of remapping.

6. The bus decoder of claim 1, wherein the circuitry is configured to determine that the address from a master unit does not match to any local slave and forward the connection to another bus.

7. The bus decoder of claim 1, wherein the circuitry is configured to, when receiving an address from a system master within a set of system masters with the same access privileges, receive a unique identification of the system master and determine additional access permissions based in part to the unique identification.

8. The bus decoder of claim 1, wherein the additional access permissions associated with a given master comprise start and end addresses of slaves the given master can access.

9. A method for providing an access to a slave unit, the method comprising:
 receiving an address from a master unit trying to access a slave unit;
 mapping the received address to a slave address;
 associating default access permissions to the master-slave connection, where a specific subset of the default access permissions is accessible to each master, the default access permissions being dependent on which slave the master is trying to access;
 determining additional access permissions associated with the master unit and the slave address, where a specific subset of the additional access permissions is accessible to each master, additional access permissions being obtained from an override table and depending on which master is trying to access the slave; and
 enabling the master-slave connection if additional access permissions allow the master unit to access the slave, otherwise reject the connection.

10. The method of claim 9, further comprising:
 applying an offset to the slave address, the offset remapping the connection to another slave unit or slave region than indicated by the address received from the master unit.

11. The method of claim 9, further comprising: applying a configurable delay to slave access for debugging purposes.

12. The method of claim 9, further comprising: determining that the address from a master unit does not match to any local slave and forward the connection to another bus.

13. The method of claim 9, further comprising:
 receiving an address from a system master within a set of system masters with the same access privileges, and receiving a unique identification of the system master;
 determining additional access permissions based in part to the unique identification.

14. The method of claim 9, further comprising:
 maintaining a region table comprising
 mapping between addresses from master units and slave addresses and
 default permissions of slave addresses.

15. The method of claim 9, further comprising:
 maintaining the override table, the override table comprising entries for slave address ranges, an entry comprising:
 start and end addresses for the entry;
 indication which default access permissions are overridden;
 additional access permissions for the overridden default permissions;
 indications of master units the additional access permissions relate to; and
 indication of remapping.

16. The method of claim 9, wherein the additional access permissions associated with a given master comprise start and end addresses of slaves the given master can access.

* * * * *